(12) United States Patent
Kahle et al.

(10) Patent No.: US 10,347,008 B2
(45) Date of Patent: *Jul. 9, 2019

(54) SELF POSITIONING CAMERA SYSTEM TO 3D CAD/BIM MODEL

(71) Applicant: Trimble Inc., Sunnyvale, CA (US)

(72) Inventors: Kent Kahle, Hayward, CA (US); Young Jin Lee, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/676,023

(22) Filed: Aug. 14, 2017

(65) Prior Publication Data

US 2019/0051014 A1    Feb. 14, 2019

(51) Int. Cl.
| | | |
|---|---|---|
| G06T 7/73 | (2017.01) | |
| G06T 7/13 | (2017.01) | |
| H04N 7/18 | (2006.01) | |
| G06T 7/33 | (2017.01) | |

(52) U.S. Cl.
CPC ............... *G06T 7/75* (2017.01); *G06T 7/13* (2017.01); *G06T 7/344* (2017.01); *G06T 7/73* (2017.01); *H04N 7/181* (2013.01); *G06T 2200/04* (2013.01); *G06T 2200/24* (2013.01); *G06T 2207/30196* (2013.01); *G06T 2207/30232* (2013.01); *G06T 2207/30244* (2013.01)

(58) Field of Classification Search
CPC ............ G06T 7/344; G06T 7/13; H04N 7/181
See application file for complete search history.

(56) References Cited

U.S. PATENT DOCUMENTS

| | | | |
|---|---|---|---|
| 2,685,082 | A | 7/1954 | Beman et al. |
| 2,966,090 | A | 12/1960 | Schöldström |
| 5,926,260 | A | 7/1999 | Dunne et al. |
| 6,064,398 | A | 5/2000 | Ellenby et al. |
| 6,097,429 | A | 8/2000 | Seeley et al. |
| 6,697,147 | B2 | 2/2004 | Ko et al. |
| 6,919,880 | B2 | 7/2005 | Morrison et al. |

(Continued)

FOREIGN PATENT DOCUMENTS

| | | |
|---|---|---|
| EP | 2 116 919 A1 | 11/2009 |
| FR | 2 630 538 A1 | 10/1989 |
| WO | 2010/148526 A1 | 12/2010 |

OTHER PUBLICATIONS

"Grade Control for Dozers," Civil Engineering and Construction, downloaded from http://construction.trimble.com/products-and-solutions/grade-control-dozers, 2 pages.

(Continued)

*Primary Examiner* — Ruiping Li
(74) *Attorney, Agent, or Firm* — Kilpatrick Townsend & Stockton LLP

(57) ABSTRACT

A camera is oriented at a workspace by comparing a three-dimensional model of the workspace to an image. A user provides an initial estimation of camera location. A feature of the three-dimensional model is projected onto the image. The feature of the three-dimensional model is compared to a corresponding feature in the image. A position and orientation of the camera are calculated by comparing the feature of the three-dimensional model the corresponding feature in the image.

20 Claims, 10 Drawing Sheets

(56) References Cited

U.S. PATENT DOCUMENTS

| | | | |
|---|---|---|---|
| 6,985,620 B2 * | 1/2006 | Sawhney | G01S 5/163 |
| | | | 345/419 |
| 7,215,364 B2 | 5/2007 | Wachtel et al. | |
| 8,350,908 B2 | 1/2013 | Morris et al. | |
| 8,874,406 B2 | 10/2014 | Røtvold et al. | |
| 2006/0174302 A1 | 8/2006 | Mattern et al. | |
| 2006/0271298 A1 | 11/2006 | MacIntosh et al. | |
| 2008/0211915 A1 | 9/2008 | McCubbrey | |
| 2008/0240616 A1 | 10/2008 | Haering et al. | |
| 2010/0183422 A1 | 7/2010 | Mäkelä et al. | |
| 2011/0115909 A1 | 5/2011 | Sternberg et al. | |
| 2012/0303336 A1 | 11/2012 | Becker et al. | |
| 2014/0016821 A1 | 1/2014 | Arth et al. | |
| 2014/0218612 A1 | 8/2014 | Belsarkar | |
| 2014/0267254 A1 * | 9/2014 | Sievert | G06T 17/05 |
| | | | 345/420 |
| 2014/0267685 A1 | 9/2014 | Kahle et al. | |
| 2016/0026253 A1 * | 1/2016 | Bradski | G02B 27/225 |
| | | | 345/8 |
| 2016/0187130 A1 * | 6/2016 | Metzler | G01C 1/04 |
| | | | 382/109 |
| 2017/0228878 A1 * | 8/2017 | Goldman | G06T 7/344 |
| 2018/0143756 A1 * | 5/2018 | Mildrew | G06F 3/011 |

OTHER PUBLICATIONS

"Trimble Total Stations," Transforming the Way the World Works, downloaded from http://trl.trimble.com/docushare/dsweb/Get/Document-752084/022516-168B_Trimble_S-Series_TS_BRO_US_0416_LR.pdf, 16 pages.

Kan, Z. "Vision-Based Estimation and Control," downloaded from https://sites.google.com/site/kanzhen0322/reserach/vision, 4 pages.

"ECAMSECURE," Commercial Security Systems, Video Monitoring, downloaded from https://www.ecamsecure.com/, 4 pages.

Extended European Search Report for EP Application No. 18188560.9 dated Dec. 4, 2018, 8 pages.

* cited by examiner

SELF POSITIONING CAMERA SYSTEM TO 3D CAD/BIM MODEL

CROSS-REFERENCE TO RELATED APPLICATIONS

This application is related to the following applications, the disclosures of each are incorporated by reference into this application for all purposes: application Ser. No. 15/604,169, filed May 24, 2017, entitled "Infrastructure Positioning Camera System"; application Ser. No. 15/604,161, filed May 24, 2017, entitled "Calibration Approach for Camera Placement"; and application Ser. No. 15/604,172, filed May 24, 2017, entitled "Measurement, Layout, Marking, Firestop Stick."

BACKGROUND

This disclosure relates to systems and methods that facilitate positioning points and objects in a work space or at a worksite, such as for example at a construction site. When an interior of a building is being finished, connectors, anchors, and the like are attached to the floors, ceilings and other structures in the building, and cuts are made and holes drilled using power saws and drills. Many tasks are accomplished using special power tools at predetermined locations, such that the tools are operated at numerous, precisely-defined positions in the building. For example, nail guns, power saws, power-anchor tools, and the like are used to nail, cut, install fasteners, and perform other operations at predetermined points within the building. In a building, a large number of electrical, plumbing, and HVAC components are properly sited and installed, usually with power tools. Additionally, finishing a building interior also uses a number of different tools that are not powered, yet are to be operated at precisely defined positions, such as for example reinforcement bar scanners. Positioning both power tools and non-power tools is to be accomplished quickly and with some precision with respect to the surrounding walls, ceilings, and floors as they are roughed in. Typically, it has used a significant amount of labor to lay out various construction points at a construction site. Teams of workers have been used to measure and mark predetermined locations. It will be appreciated that this process has been subject to errors, resulting from measurement mistakes and from accumulated errors. Further, the cost of this layout process and the time needed to perform the layout process have both been significant.

Various location determining systems, including systems that incorporate one or more robotic total stations, have been used for building layout. The total station in such a system, positioned at a fixed, known location, directs a beam of laser light at a retro-reflective target. As the target moves, robotics in the total station cause the beam of light to track the target. Since the dimensional coordinates of the total station are known, the dimensional coordinates of the retro-reflective target can be determined. Based on the measured position of the retro-reflective target, and the desired position of some building feature, such as a drilled hole and/or a fastener, the operator can move the reflector to the desired position, and mark the position.

Although position determination systems, such as ranging radio systems and robotic total station systems, can facilitate and speed the layout process, the layout process has continued to be lengthy, tedious, and expensive. Previous applications have been filed addressing systems and/or methods to reduce construction expense and/or labor. For example, U.S. patent application Ser. No. 13/800,350, filed Mar. 13, 2013, which is incorporated by reference, provides systems and methods for positioning a tool in a work space.

BRIEF SUMMARY

In some embodiments, a system for tool positioning, as-built documentation, and/or personnel monitoring in construction site using a camera network is described. Camera units are placed at multiple, unknown locations in a construction site to visually cover a working volume. A camera unit is self-positioned by comparing an image to a model of the construction site. Camera units, in combination with a main processing computer, can detect and calculate positions of objects in the working volume.

In some embodiments, a method for using a camera system to determine a location of a camera unit in relation to a three-dimensional model comprises: retrieving a model of a worksite, wherein the model is a three-dimensional model; retrieving an image of the worksite, wherein the image is acquired using a camera at the worksite; receiving coarse input for a position and/or an orientation of the camera in relation to the model; projecting a feature of the model onto the image; comparing a feature in the image to the feature in model projected onto the image; and/or calculating the position and/or the orientation of the camera in relation to the model based on aligning the feature of the model with the image. In some embodiments, the feature of the model comprises a point; the feature of the model used comprises at least five points and no more than ten points; the feature of the model comprises a line; the line corresponds to an edge of a wall, a floor, and/or a ceiling; the feature of the model comprises outlines of two or more walls; and/or the feature in the image is identified by analyzing gradients of pixels in the image. In some embodiments, the method further comprises acquiring the image of the worksite using the camera at the worksite, wherein the camera comprises two image sensors.

In some embodiments, a camera system comprises: a camera configured to acquire an image of a worksite; an electronic model of the worksite; and/or one or more processors configured to: retrieve the electronic model of the worksite, wherein the electronic model is a three-dimensional model, retrieve the image of the worksite, receive coarse input for a position and/or an orientation of the camera in relation to the electronic model, project a feature of the electronic model onto the image, compare a feature in the image to the feature in the electronic model projected onto the image, and/or calculate the position and/or the orientation of the camera in relation to the electronic model based on aligning the feature of the electronic model with the feature in the image. In some embodiments, the feature in the electronic model comprises at least five points and no more than ten points; the feature in the electronic model comprises a line; the line corresponds to an edge of a wall, a floor, and/or a ceiling; the feature in the electronic model comprises outlines of two or more walls; and/or the feature in the image is identified by analyzing gradients of pixels in the image.

In some embodiments, a memory device comprises instructions that when executed cause one or more processors to: retrieve a model of a worksite, wherein the model is a three-dimensional model; retrieve an image of the worksite, wherein the image is acquired using a camera at the worksite; receive coarse input for a position and/or an orientation of the camera in relation to the model; project a feature of the model onto the image; compare a feature in the image to the feature of the model projected onto the image; and/or calculate the position and/or the orientation of the camera in relation to the model based on aligning the feature of the model with the image.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

While an interior of a building is being finished, connectors, anchors, and the like are attached to the floors, ceilings, and other structures in the building. Further, cuts are made and holes drilled using power saws and drills. Tools, such as special power tools, are used at predetermined locations, such that the tools are operated at numerous, precisely-defined positions in the building. For example, nail guns, power saws, power anchor tools, and the like are used to nail, cut, install fasteners, and/or perform other operations at predetermined points within the building. In some buildings, a large number of electrical, plumbing, and HVAC components are sited and installed, usually with power tools. Additionally, finishing a building interior also uses a number of different tools that are not powered, which are also operated at precisely-defined positions, such as for example reinforcement bar scanners. Positioning both power tools and non-power tools quickly and with precision (e.g., with respect to surrounding walls, ceilings, and floors) can save time and reduce construction costs. In some embodiments, systems and/or methods are described to speed up, reduce manual labor, and/or reduce expense of construction.

Figure 1:
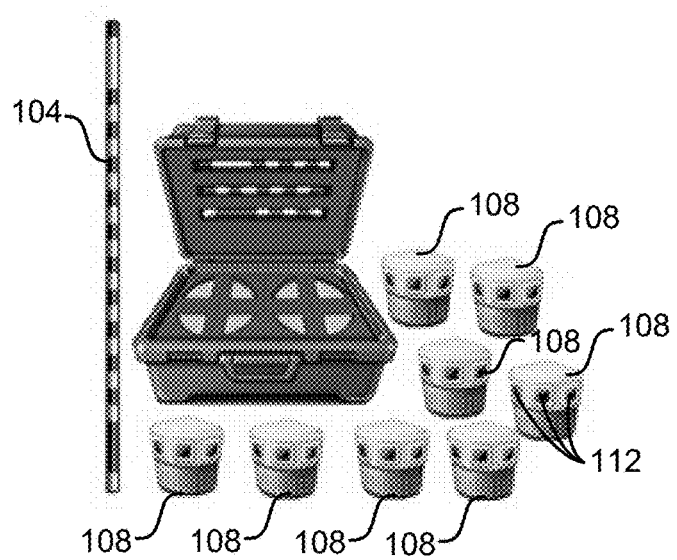
FIG. 1 depicts a simplified drawing of an embodiment of a camera system with a measurement stick.

Referring first to FIG. 1, a simplified drawing of an embodiment of a camera system is shown. The camera system comprises camera units 108 and a main processing computer. The camera system comprises two or more camera units 108. In some embodiments, the camera system comprises two or more measurement sticks 104, and/or two or more main processing computers.

A camera unit 108 comprises a processor unit, a communication device, and/or one or more imaging devices 112 (e.g., two and/or three imaging devices 112). The imaging devices 112 have a position and/or orientation that is known relative to other imaging device(s) 112 and/or camera unit(s) 108. The imaging devices 112 acquire image sequences. The processor unit in the camera unit 108 processes the image sequences. The communication device transmits and receives data with the main processing computer.

Figure 2:
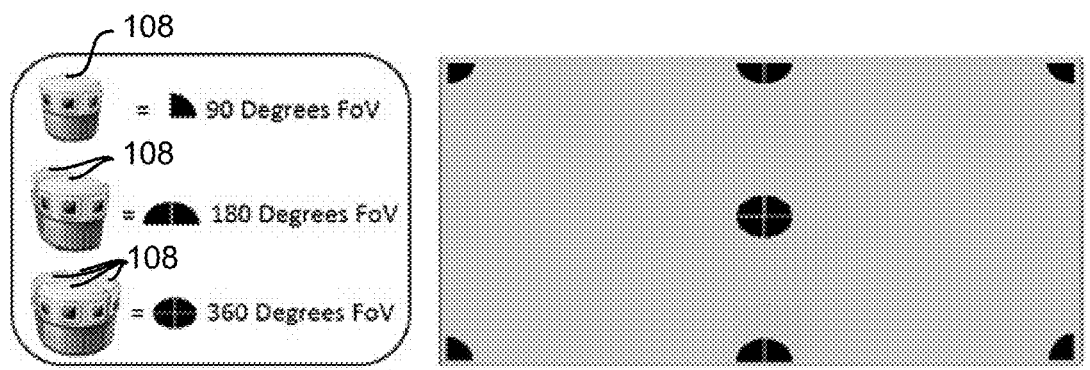
FIG. 2 depicts a simplified drawing of an embodiment of a configuration of camera units at a worksite.

In FIG. 2, a simplified drawing of an embodiment of a configuration of camera units 108 at a worksite is shown. An operator attaches camera units 108 to a column, wall, etc. The operator can add and/or subtract camera units 108 depending on a size of the worksite and/or a position of the camera unit 108.

Figure 3:
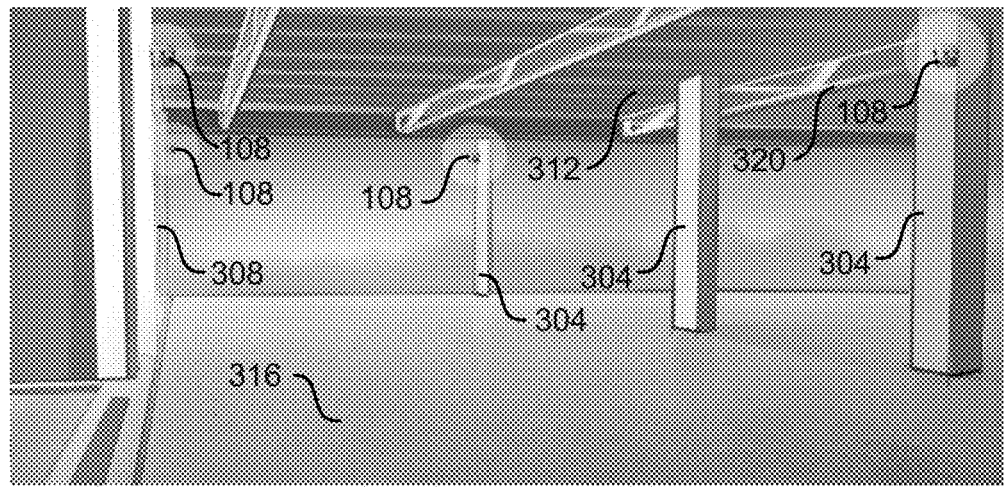
FIG. 3 depicts a simplified perspective drawing of an embodiment of camera units placed in a worksite.

FIG. 3 depicts a simplified perspective drawing of an embodiment of camera units 108 placed in a worksite. The operator attaches the camera units 108 to a column 304, wall 308, ceiling 312, floor 316, truss 320, etc. Camera units 108, which are modular, allow for quick setup.

Figure 4:
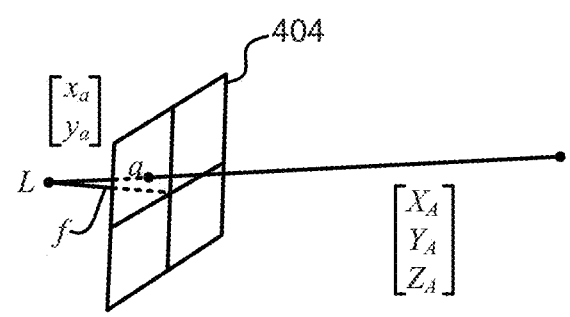
FIG. 4 depicts a simplified drawing of the collinearity condition.

Camera units 108 can be used to determine a three-dimensional position of an object at the worksite. In some embodiments, a collinearity condition, sometimes referred to as collinearity equations, is used in calculating the three-dimensional line equation. FIG. 4 depicts a simplified drawing of the collinearity condition. The collinearity condition represents a geometric relationship wherein a point (A) in an object space, an image of the point (a) on an image plane 404, and a perspective center (L) of the image plane 404 are on a straight line in three-dimensional space.

The collinearity condition can be expressed by the following equations:

$$x_a = x_o - f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right] = x_o - f\frac{r}{q}$$

-continued
$$y_a = y_o - f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right] = y_o - f\frac{s}{q}$$

Figure 5:
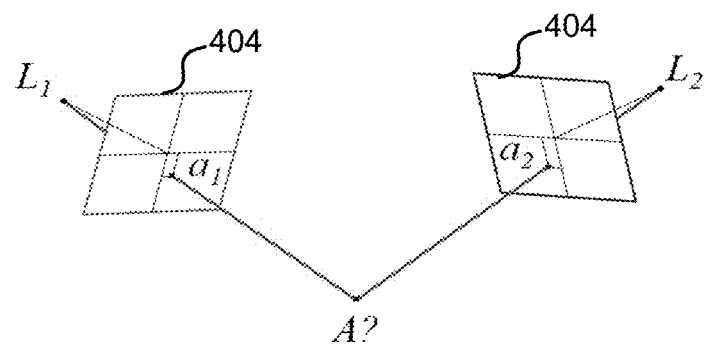
FIG. 5 illustrates the concept of space intersection for two cameras.

In the above equations, $x_a$ and $y_a$ are coordinates of the image of the point (a) (sometimes referred to as photo coordinates); $x_o$ and $y_o$ are coordinates of the principal point (the principal point is the point on the image plane 404 onto which the perspective center (L) is projected); f is a focal length of a camera (e.g., of an imaging device 112); $X_L$, $Y_L$, and $Z_L$ are object space coordinates of the perspective center L; $X_A$, $Y_A$, and $Z_A$ are object space coordinates of point A; and the m's are functions of the three rotation angles ($\omega$, $\varphi$, and $\kappa$) such that:

$m_{11} = \cos\varphi \cos\kappa$ $m_{12} = \sin\omega \sin\varphi \cos\kappa + \cos\omega \sin\kappa$ $m_{13} = -\cos\omega \sin\varphi \cos\kappa + \sin\omega \sin\kappa$ $m_{21} = -\cos\varphi \sin\kappa$ $m_{22} = -\sin\omega \sin\varphi \sin\kappa + \cos\omega \cos\kappa$ $m_{23} = \cos\omega \sin\varphi \sin\kappa + \sin\omega \cos\kappa$ $m_{31} = \sin\varphi$ $m_{32} = -\sin\omega \cos\varphi$ $m_{33} = \cos\omega \cos\varphi$ Since the collinearity equations are nonlinear, the linearized forms of the equations are used to iteratively solve many photogrammetric solutions. The collinearity equations can be linearized by using Taylor's theorem. In this manner, the collinearity equations can be written as follows (simplified):

$J = b_{11}d\omega + b_{12}d\varphi + b_{13}d\kappa - b_{14}dX_L - b_{15}dY_L - b_{16}dZ_L + b_{14}dX_A + b_{15}dY_A + b_{16}dZ_A + e_{x_a}$ $K = b_{21}d\omega + b_{22}d\varphi + b_{23}d\kappa - b_{24}dX_L - b_{25}dY_L - b_{26}dZ_L + b_{24}dX_A + b_{25}dY_A + b_{26}dZ_A + e_{y_a}$ Space Intersection. Space intersection is the photogrammetric process that estimates 3D coordinates of a point in the object space from photo coordinates observations in a stereo pair. FIG. 5 illustrates the concept of space intersection. Known values are the exterior orientation parameters of two photographs ($L_1$, $L_2$), photo coordinates of a point ($a_1$, $a_2$) in each photograph, and initial value for the point in object space (A). In some embodiments, the initial value for the point in object space (A) is determined by calculating a first vector starting at the perspective center of the first camera and to photo coordinates of a point on an image plane of the first camera; calculate a second vector for the second camera (e.g., starting at a perspective center of the second camera to a point on an image plane of the second camera); calculating an intersection of the first vector and the second vector, and if an intersection does not exist, finding a point near (e.g., closest point between) the first vector and the second vector.

The following equations shows the linearized form of the collinearity equations for space intersection. Since the exterior orientation parameters of each photograph are known, the object coordinate terms ($dX_A$, $dY_A$, $dZ_A$) are estimated iteratively in the linearized form of the collinearity condition equation.

$J = b_{14}dX_A + b_{15}dY_A + b_{16}dZ_A + e_{x_a}$ $K = b_{24}dX_A + b_{25}dY_A + b_{26}dZ_A + e_{y_a}$

The following equation shows the matrix form of the previous equations. Subscripts C0 and C1 represent cameras 0 and 1 (or photographs 0 and 1), respectively. The solution of the equation can be estimated iteratively using Least-square solution.

$$\begin{bmatrix}(J)_{c_0}\\(K)_{c_0}\\(J)_{c_1}\\(K)_{c_1}\end{bmatrix} + \begin{bmatrix}(b_{14})_{c_0} & (b_{15})_{c_0} & (b_{16})_{c_0}\\(b_{24})_{c_0} & (b_{25})_{c_0} & (b_{26})_{c_0}\\(b_{14})_{c_1} & (b_{15})_{c_1} & (b_{16})_{c_1}\\(b_{24})_{c_1} & (b_{25})_{c_1} & (b_{26})_{c_1}\end{bmatrix}\begin{bmatrix}dX_A\\dY_A\\dZ_A\end{bmatrix} + e$$

The following table shows the iterative space intersection algorithm.

Data: photo coordinate observatons: $(x_a, y_a)_{C_0}$, $(x_a, y_a)_{C_1}$
Initial values of point A: $(X_A, Y_A, Z_A)$
While ($\|\xi\|$) > threshold Calculate design and y matrix:
$$A = \begin{bmatrix}(b_{14})_{C_0} & (b_{15})_{C_0} & (b_{16})_{C_0}\\(b_{24})_{C_0} & (b_{25})_{C_0} & (b_{26})_{C_0}\\(b_{14})_{C_1} & (b_{15})_{C_1} & (b_{16})_{C_1}\\(b_{24})_{C_1} & (b_{25})_{C_1} & (b_{26})_{C_1}\end{bmatrix}$$

$$y = \begin{bmatrix}(J)_{C_0}\\(K)_{C_0}\\(J)_{C_1}\\(K)_{C_1}\end{bmatrix}$$

Estimate parameter matrix:
$$\xi = \begin{bmatrix}dX_A\\dY_A\\dZ_A\end{bmatrix} = (A^T A)^{-1} A^T y$$

Update solution:
$$\begin{bmatrix}X_A\\Y_A\\Z_A\end{bmatrix} = \begin{bmatrix}X_A\\Y_A\\Z_A\end{bmatrix} + \begin{bmatrix}dX_A\\dY_A\\dZ_A\end{bmatrix}$$

End
Result: 3D object space coordinates of point A

Figure 6:
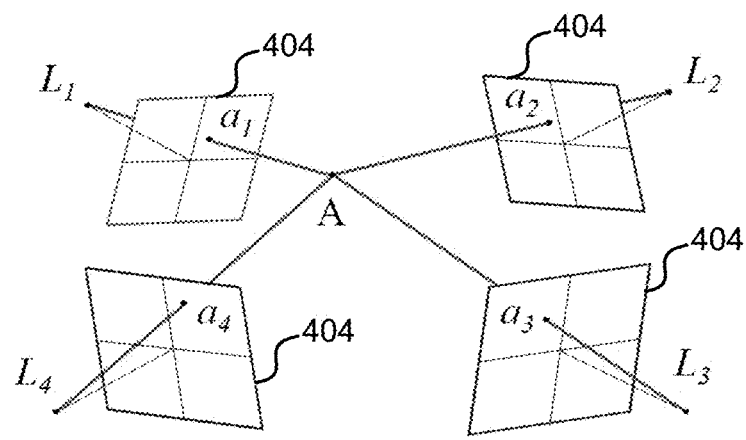
FIG. 6 illustrates the concept of space intersection for four cameras.

Space intersection with multiple cameras. A bundle adjustment technique can be used to solve for the space intersection solution in a multiple camera case. FIG. 6 illustrates the concept of space intersection for the multiple camera case. Known values are the exterior orientation parameters of the cameras or photographs ($L_1$, $L_2$, $L_3$, and $L_4$), the photo coordinates of a point ($a_1$, $a_2$, $a_3$, and $a_4$), and the initial value for the point in object space (A) is a center of the object space.

The following equation shows a matrix form of space intersection equation for the multiple camera case. In this equation, subscripts $C_0$, $C_1$, $C_2$ and $C_3$ represent cameras 0, 1, 2, and 3, respectively. Solution of equation can be estimated iteratively by using least-squares solution. The sizes of the design matrix and the observation matrix are 2n×3 and 2n×1, respectively; where n is the number of cameras (or photographs).

$$\begin{bmatrix} (J)_{c_0} \\ (K)_{c_0} \\ (J)_{c_1} \\ (K)_{c_1} \\ (J)_{c_2} \\ (K)_{c_2} \\ (J)_{c_3} \\ (K)_{c_3} \end{bmatrix} + \begin{bmatrix} (b_{14})_{c_0} & (b_{15})_{c_0} & (b_{16})_{c_0} \\ (b_{24})_{c_0} & (b_{25})_{c_0} & (b_{26})_{c_0} \\ (b_{14})_{c_1} & (b_{15})_{c_1} & (b_{16})_{c_1} \\ (b_{24})_{c_1} & (b_{25})_{c_1} & (b_{26})_{c_1} \\ (b_{14})_{c_2} & (b_{15})_{c_2} & (b_{16})_{c_2} \\ (b_{24})_{c_2} & (b_{25})_{c_2} & (b_{26})_{c_2} \\ (b_{14})_{c_3} & (b_{15})_{c_3} & (b_{16})_{c_3} \\ (b_{24})_{c_3} & (b_{25})_{c_3} & (b_{26})_{c_3} \end{bmatrix} \begin{bmatrix} dX_A \\ dY_A \\ dZ_A \end{bmatrix} + e$$

Figure 7:
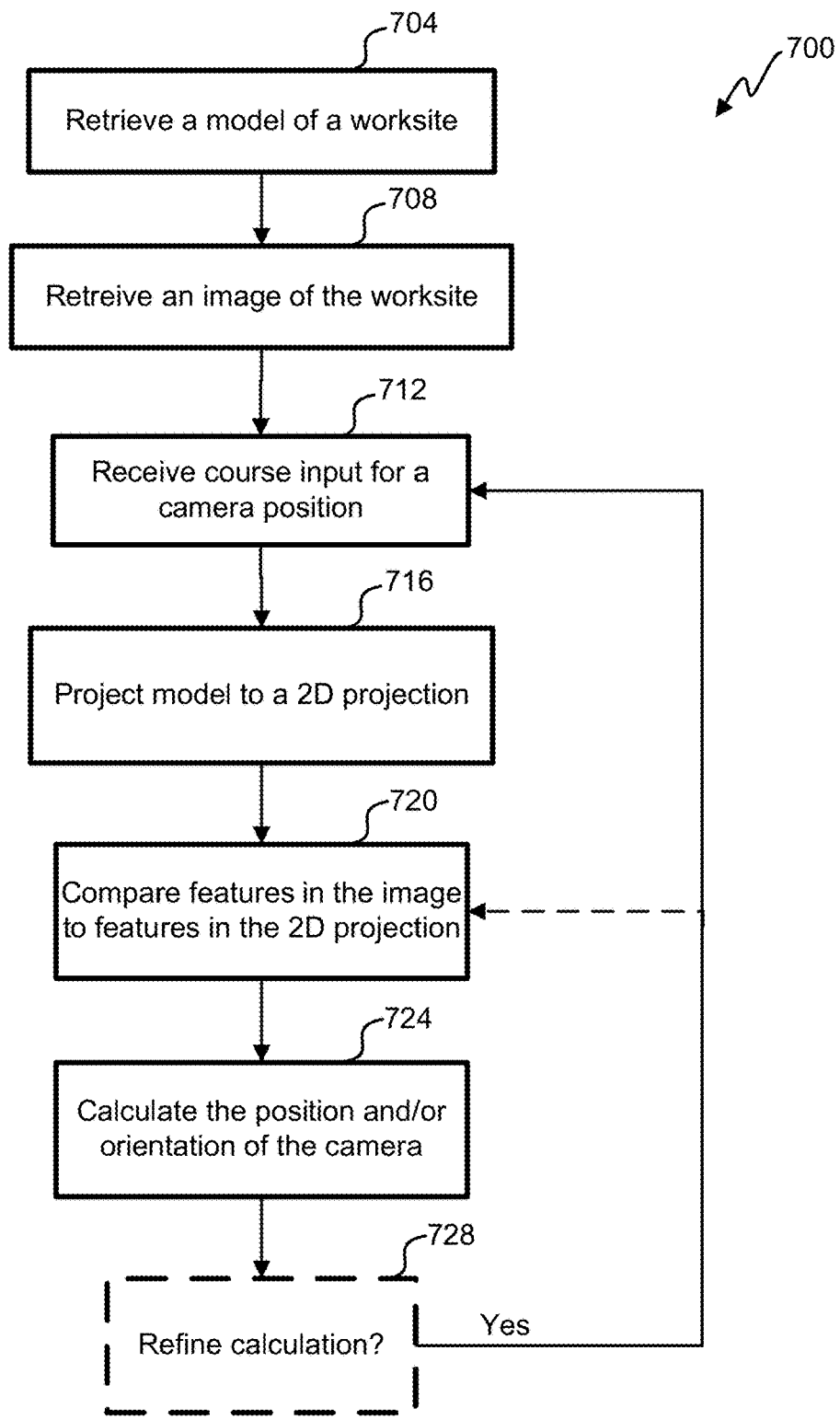
FIG. 7 illustrates a flowchart of an embodiment of a process for determining a position and/or orientation of a camera at a worksite.

Referring next to FIG. 7, a flowchart of an embodiment of a process 700 for determining a position and/or orientation of a camera at a worksite is illustrated. Process 700 begins in step 704 with retrieving a model of the worksite. The model is a three-dimensional model. In some embodiments, the model is a Building Information Modeling (BIM) file.

In step 708, an image of the worksite is retrieved. In some embodiments, the image is stored as an image file, such as a Joint Photographic Experts Group (JPEG), a Tagged Image File Format (TIFF), a Graphics Interchange Format (GIF), and/or a Windows bitmap (BMP) file. The image is acquired by the camera (e.g., using an image sensor in a camera unit 108) at the worksite.

In step 712, coarse input for a camera position is received. The coarse input for the camera is in relation to the model. In some embodiments, the coarse input for the camera position is received by a user marking an estimated camera position in a computer application (e.g., on the model). The model is projected to a two-dimensional projection based on the coarse input, step 716.

Features in the image are comparted to features in the two-dimensional projection, 720. To compare features in the image to features in the two-dimensional projection, features in the image are identified, which correspond to features in the two-dimensional projection. In some embodiments, a feature is a point. In some embodiments, a feature is a line. For example, an outline of a wall (e.g., four lines) in the two-dimensional projection is overlaid on the image. An outline of the wall in the image is detected. And the position and/or orientation of the camera is calculated so that the outline of the wall in the two-dimensional projection overlaps the outline of the wall in the image. In some embodiments, to determine an overlap, a least-squares fit is used.

In optional step 728, an iterative process is used. In step 728, a determination is made to refine the calculation of the position and/or orientation of the camera. The calculated position and/or orientation of the camera of step 724 is fed back into step 712 as coarse input and/or into step 720 for comparing features in the image to features of the two-dimensional projection. In some embodiments, different features are used (e.g., a second wall, a third wall, a ceiling, and/or a floor).

Example Approach

In an example approach, an estimation of a camera position and orientation is estimated in relation to a building information model (BIM). Since some BIMs contain a large amount of data, the example approach is semi-automated. In the example approach, the BIM is divided into a plurality of BIM files. In the example approach, only the BIM file(s), of the plurality of BIM files, that corresponds to a locality of the camera is retrieved. The BIM file is retrieved based on user input for the coarse position of the camera.

After retrieval of the relevant model, the user provides the coarse position of the camera. Algorithms, starting from this coarse position, estimate position and orientation of the camera using both the BIM and the image. The coarsely aligned BIM provides 3D information of the worksite (e.g., dimensions of elements and relative placements of each element at the worksite). To match a BIM to an image, the following equation is used:

$$B = CDE;$$

where, $$B = s \begin{bmatrix} u \\ v \\ 1 \end{bmatrix},$$

$$C = \begin{bmatrix} f_x & 0 & c_x \\ 0 & f_y & c_y \\ 0 & 0 & 0 \end{bmatrix},$$

$$D = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}, \text{and}$$

$$E = \begin{bmatrix} X \\ Y \\ Z \\ 1 \end{bmatrix};$$

such that, $$s \begin{bmatrix} u \\ v \\ 1 \end{bmatrix} = \begin{bmatrix} f_x & 0 & c_x \\ 0 & f_y & c_y \\ 0 & 0 & 0 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}.$$

B corresponds to known two-dimensional points of the image. C corresponds to known internal parameters (e.g., focal length of a lens of the camera). D corresponds to camera orientation and position (unknown). E corresponds to three-dimensional known points (e.g., from the BIM file).

Initial estimation. An initial projection matrix can be determined using either points or lines. The initial estimation of the projection matrix starts with selecting point correspondences from the BIM and the image. In some embodiments, a system selects lines in both the BIM and the image (e.g., selecting lines from an outline of a wall, ceiling, or floor). In some embodiments, as few as five to nine points are used. In some embodiments, selected points in the image do not have to exactly match BIM points, wherein others' approaches algorithms highly depend on points a user selects. Although a poor initial point selection does not have a significantly negative effect on the accuracy of the estimated position and orientation, it may be more consuming for processing compared to a more accurate initial point selection. Applicant has found that line-based projection is generally more stable than point-based projection. Moreover, line-based estimation has a better performance than point-based estimation in terms of noise resistance from a computational point of view. Although estimation based on line correspondences is considered as a dual of one based on point correspondences, or is regarded projectively equivalent, we find from a numerical point of view, an estimation based on line correspondences is more robust.

Figure 8:
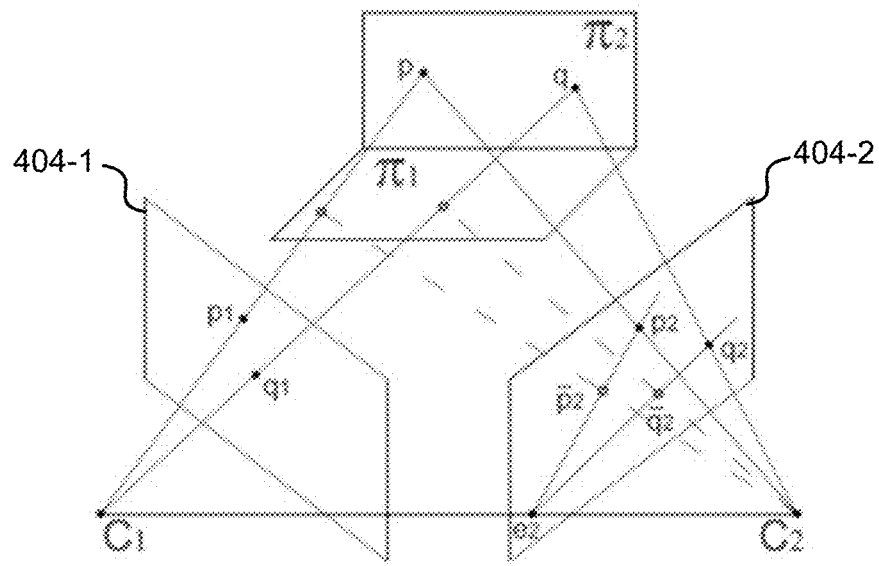
FIG. 8 depicts an embodiment of point projection.

FIG. 8 depicts an embodiment of a point projection. C1 is a position of a first camera. The first camera has a first image plan 404-1. C2 is a position of a second camera. The second camera has a second image plan 404-2. Points p and q are imaged in the first image plane 404-1 and in the second image plane 404-2.

Figure 9:
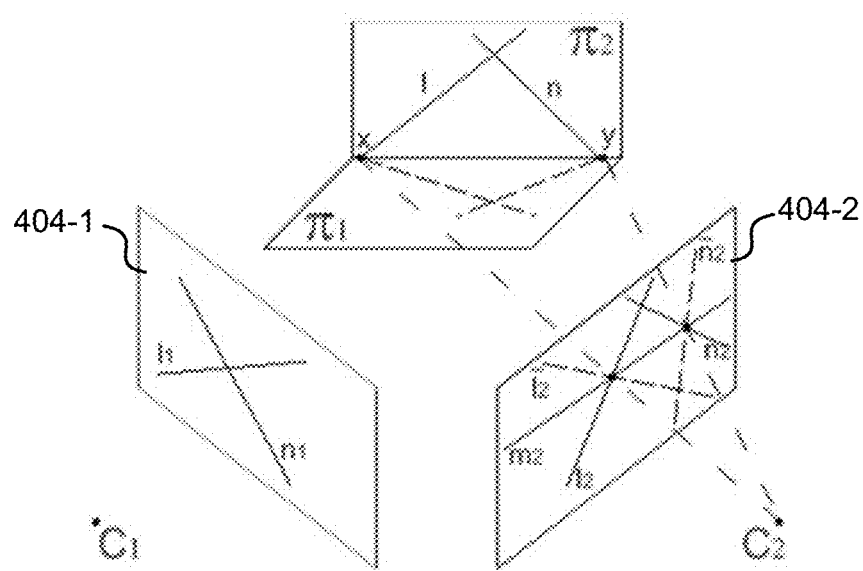
FIG. 9 depicts an embodiment of line projection.

FIG. 9 depicts an embodiment of a line projection. C1 is a position of a first camera. The first camera has a first image plane 404-1. C2 is a position of a second camera. The second camera has a second image plane 404-2. Lines l and n are imaged in the first image plane 404-1 and in the second image plane 404-2.

An initial alignment comprises two steps: (1) a projection and (2) a homography. The projection maps the 3D model to the image. The homography uses the points and/or lines from the 3D model (e.g., lines outlining a wall). In some embodiments, the points and/or lines are selected by a user previously. In some embodiments, the system selects lines automatically (e.g., the system is configured to identify a wall, a floor, and/or a ceiling in the 3D model). In some embodiments, the homography uses a perspective from a coarse position of the camera entered by the user.

Figure 10:
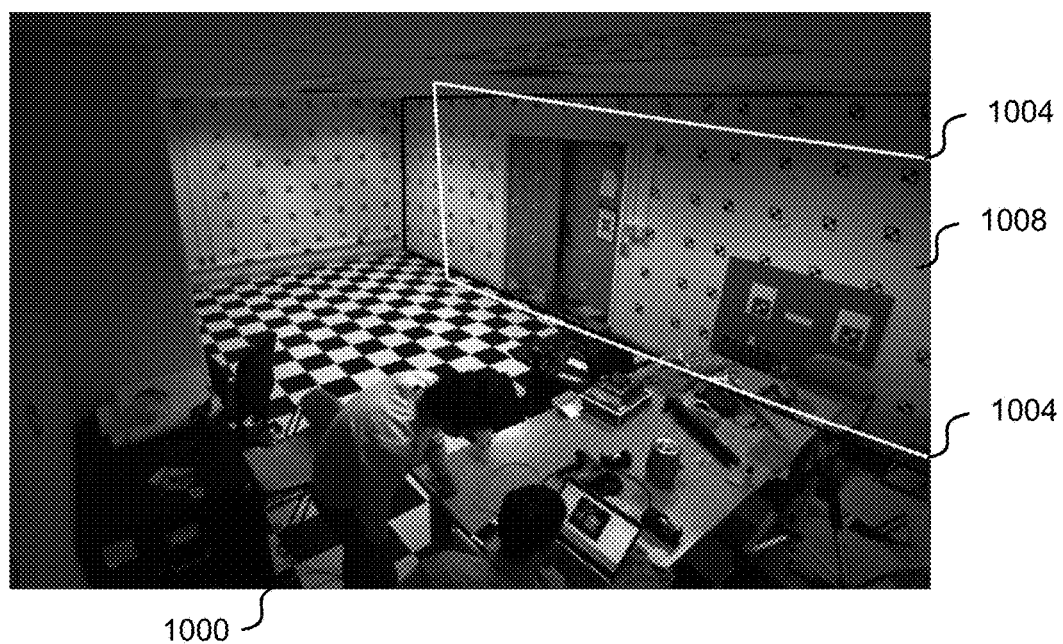
FIG. 10 depicts an embodiment of an image with a projection of an outline of a wall from a three-dimensional model.

FIG. 10 depicts an embodiment of an image 1000 with a projection 1004 of an outline of a wall from a 3D model. FIG. 10 demonstrates the projection and the homography steps of the initial estimation. Although the initial estimation is close to aligning the projection 1004 with a wall 1008 in the image, the projection 1004 can be aligned more closely to the wall 1008.

The projection 1004 is fitted to edges in the image 1000. For example, the image 1000 is converted from color to gray tone. A derivative filter is then applied to the gray-tone image to produce a derivative image. In some embodiments, the derivative filter is a Laplacian filter. In the derivative image, edges are easier to identify. Edges are areas where pixel values change rapidly (sometimes referred to as "corners"). A plane (e.g., projection 1004) is fitted to intensity of edges of the image 1000. After a parametric plane for each pixel intensity based on neighbor edges is defined, gradient of each pixel of the image edges can be determined from a plane normal vector. In some embodiments, the parametric plane is a virtual plane (not physical) fitted to grayscale values in space (x,y, I(x,y)) where I(x,y) are intensity values. Plane fitting uses gradient of intensities; a normal of a virtual plane defines an edge direction.

Figure 11:
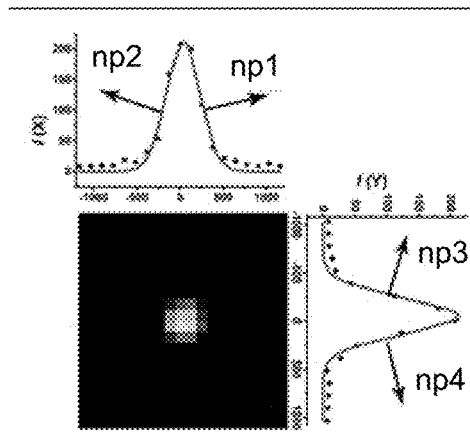
FIG. 11 shows an intensity-based fitting plane algorithm successfully aligning a BIM to an edge.
Figure 12:
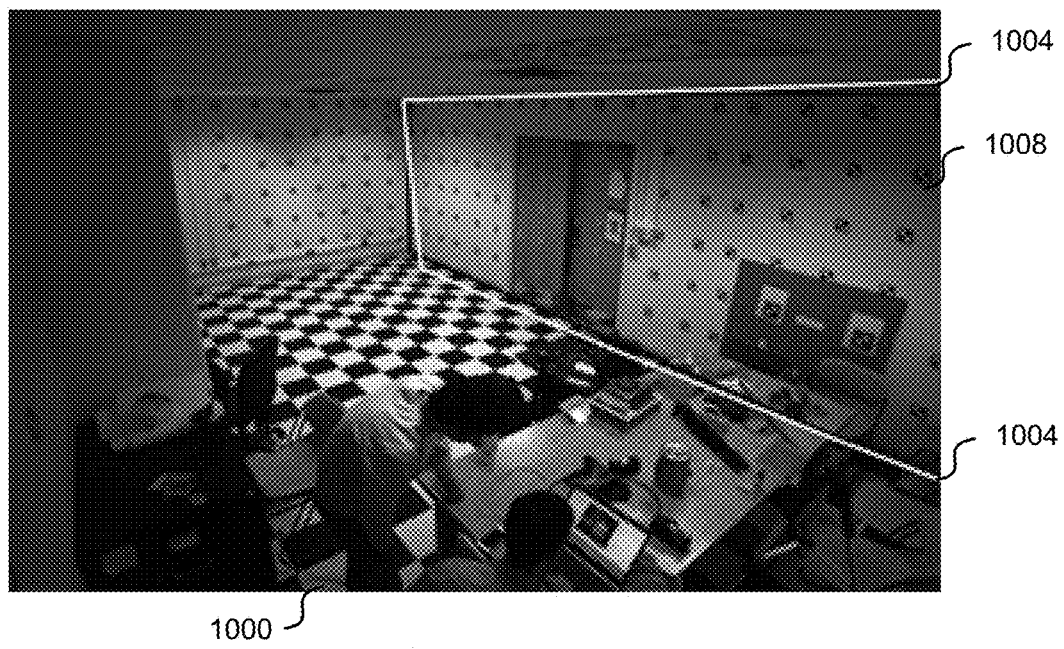
FIGS. 12 and 13 show embodiments of the projection of the outline of the wall better aligned to the image.
Figure 13:
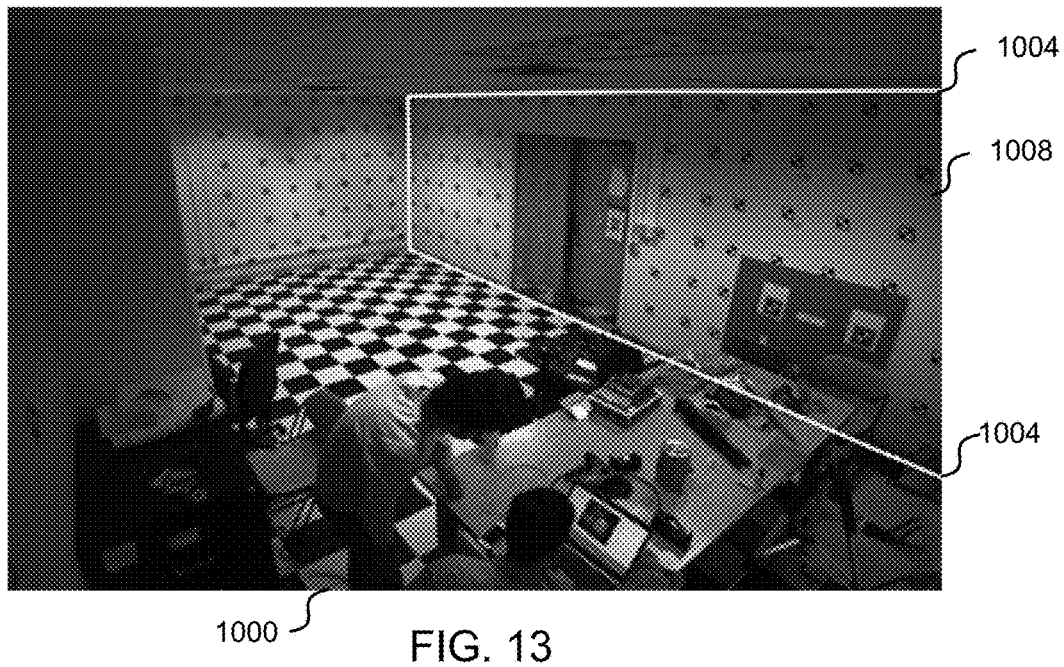

FIG. 11 shows an intensity-based fitting plane algorithm successfully aligning a BIM to an edge. Extrinsic camera parameters (rotation and position) are updated. FIG. 11 shows normal directions for fitted virtual planes np. A first normal direction np1, a second normal direction np2, a third normal direction np3, and a fourth normal direction np4 are shown. FIG. 12 shows an embodiment of the projection 1004 better aligned to the image 1000. Extrinsic camera parameters (rotation and position) are updated in each iteration and eventually final camera parameters are generated that align the projection 1004 and the image 1000, FIG. 13. Final camera parameters generate a homography that maps the initial estimation from FIG. 10 to FIG. 13.

Extrinsic camera parameters (rotation and position) are calculated based on constraints that fulfill characteristics of rotation and translation matrices. In some embodiments, an accuracy of estimated camera orientation and position for a relatively large room (23×16×10 feet$^3$) is as low as 4 inches. A similar procedure can be done for other walls, ceiling, and/or floor. Each wall provides a different set of camera parameters. Since walls other than the wall 1008 used to estimate extrinsic parameters were not involved, camera parameters might be biased. To reduce biasing, camera parameters from walls, the ceiling, and/or the floor are used. Using camera parameters from more than one surface (e.g., wall) will reduce errors and render more accurate results.

Figure 14:
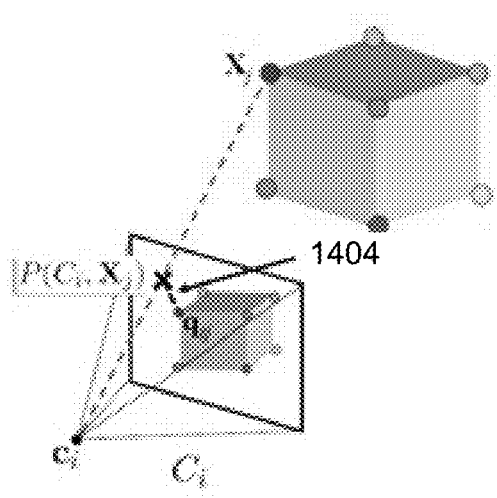
FIG. 14 depicts an embodiment of a single camera matrix.

Referring next to FIG. 14, an embodiment for a single camera matrix is shown. The single camera matrix reduces re-projection error using bundle adjustment. Bundle adjustment refines 3D coordinates describing a scene geometry, parameters of the relative motion, and/or optical characteristics of the camera. However, a typical bundle adjustment compensates re-projection errors using several cameras. Yet bias caused by considering walls separately with a modified bundle adjustment (BA) algorithm can reduce errors. Thus in some embodiments, only one camera with parameters for different walls is used (e.g., first parameters for a first wall and second parameters for a second wall). FIG. 14 displays how bundle adjustment reduces re-projection error. Reprojection error 1404 is calculated by:

$$\text{reprojection error} = \nu q_{ij} - P(C_i, X_j)\|.$$

The objective function is:

$$g(C, X) = \Sigma_{i=1}^n \Sigma_{j=1}^m w_{ij} \| q_{ij} - P(C_i, X_j) \|.$$

The variable, $w_{ij}$ is 1 if point j is visible, 0 otherwise.

Figure 15:
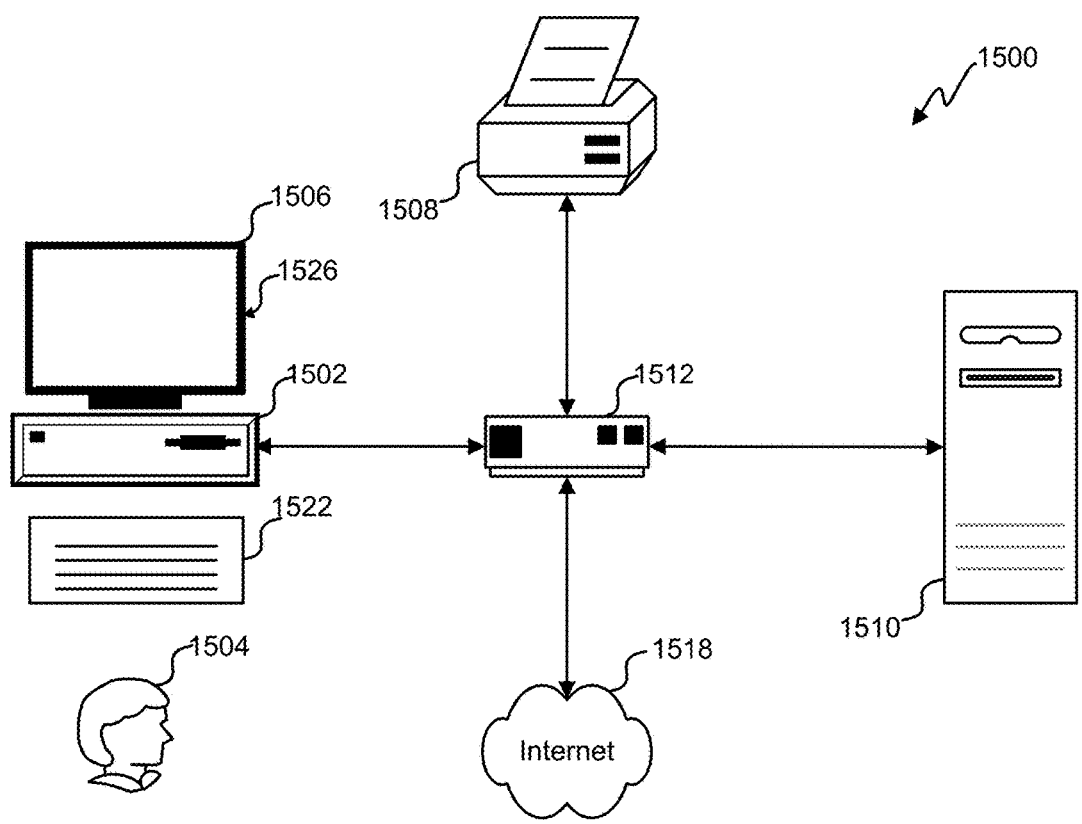
FIG. 15 depicts a block diagram of an embodiment of a computer system.

Referring next to FIG. 15, an exemplary environment with which embodiments may be implemented is shown with a computer system 1500 that can be used by a designer 1504 to design, for example, electronic designs. The computer system 1500 can include a computer 1502, keyboard 1522, a network router 1512, a printer 1508, and a monitor 1506. The monitor 1506, processor 1502 and keyboard 1522 are part of a computer system, which can be a laptop computer, desktop computer, handheld computer, mainframe computer, etc. The monitor 1506 can be a CRT, flat screen, etc.

A designer 1504 can input commands into the computer 1502 using various input devices, such as a mouse, keyboard 1522, track ball, touch screen, etc. If the computer system 1500 comprises a mainframe, a designer 1504 can access the computer 1502 using, for example, a terminal or terminal interface. Additionally, the computer 1502 may be connected to a printer 1508 and a server 1510 using a network router 1512, which may connect to the Internet 1518 or a WAN.

The server 1510 may, for example, be used to store additional software programs and data. In one embodiment, software implementing the systems and methods described herein can be stored on a storage medium in the server 1510. Thus, the software can be run from the storage medium in the server 1510. In another embodiment, software implementing the systems and methods described herein can be stored on a storage medium in the computer 1502. Thus, the software can be run from the storage medium in the computer 1502. Therefore, in this embodiment, the software can be used whether or not computer 1502 is connected to network router 1512. Printer 1508 may be connected directly to computer 1502, in which case, the computer system 1500 can print whether or not it is connected to network router 1512.

Figure 16:
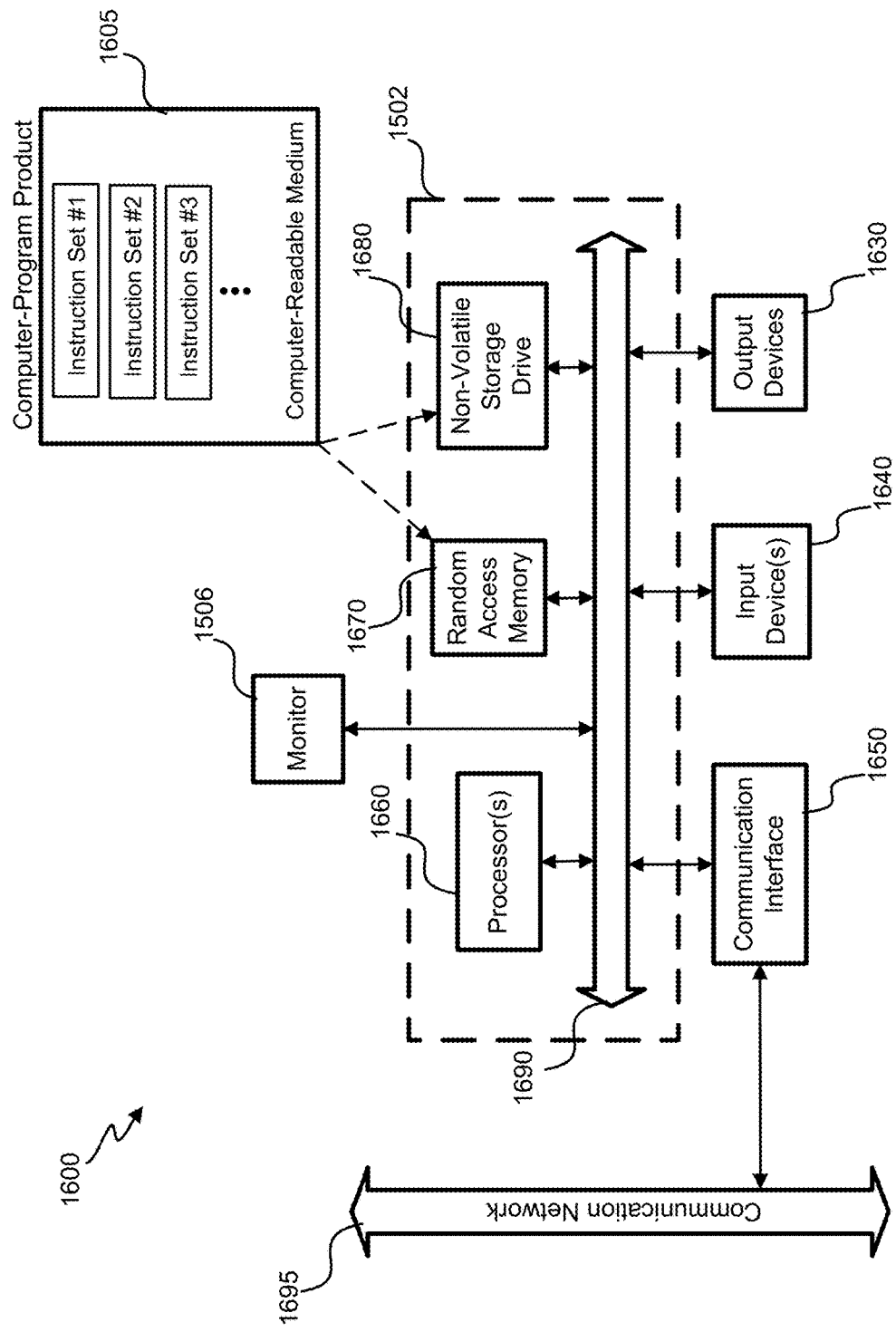
FIG. 16 depicts a block diagram of an embodiment of a special-purpose computer system.

With reference to FIG. 16, an embodiment of a special-purpose computer system 1600 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it is transformed into the special-purpose computer system 1600.

Special-purpose computer system 1600 comprises a computer 1502, a monitor 1506 coupled to computer 1502, one or more additional user output devices 1630 (optional) coupled to computer 1502, one or more user input devices 1640 (e.g., keyboard, mouse, track ball, touch screen) coupled to computer 1502, an optional communications interface 1650 coupled to computer 1502, a computer-program product 1605 stored in a tangible computer-readable memory in computer 1502. Computer-program product 1605 directs system 1600 to perform the above-described methods. Computer 1502 may include one or more processors 1660 that communicate with a number of peripheral devices via a bus subsystem 1690. These peripheral devices may include user output device(s) 1630, user input device(s) 1640, communications interface 1650, and a storage subsystem, such as random access memory (RAM) 1670 and non-volatile storage drive 1680 (e.g., disk drive, optical drive, solid state drive), which are forms of tangible computer-readable memory.

Computer-program product 1605 may be stored in non-volatile storage drive 1680 or another computer-readable medium accessible to computer 1502 and loaded into memory 1670. Each processor 1660 may comprise a microprocessor, such as a microprocessor from Intel® or Advanced Micro Devices, Inc.®, or the like. To support computer-program product 1605, the computer 1502 runs an operating system that handles the communications of product 1605 with the above-noted components, as well as the communications between the above-noted components in support of the computer-program product 1605. Exemplary operating systems include Windows® or the like from Microsoft Corporation, Solaris® from Sun Microsystems, LINUX, UNIX, and the like.

User input devices 1640 include all possible types of devices and mechanisms to input information to computer 1502. These may include a keyboard, a keypad, a mouse, a scanner, a digital drawing pad, a touch screen incorporated into the display, audio input devices such as voice recognition systems, microphones, and other types of input devices. In various embodiments, user input devices 1640 are typically embodied as a computer mouse, a trackball, a track pad, a joystick, wireless remote, a drawing tablet, a voice command system. User input devices 1640 typically allow a user to select objects, icons, text and the like that appear on the monitor 1506 via a command such as a click of a button or the like. User output devices 1630 include all possible types of devices and mechanisms to output information from computer 1502. These may include a display (e.g., monitor 1506), printers, non-visual displays such as audio output devices, etc.

Communications interface 1650 provides an interface to other communication networks and devices and may serve as an interface to receive data from and transmit data to other systems, WANs and/or the Internet 1518. Embodiments of communications interface 1650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1650 may be coupled to a computer network, to a FireWire® bus, or the like. In other embodiments, communications interface 1650 may be physically integrated on the motherboard of computer 1502, and/or may be a software program, or the like.

RAM 1670 and non-volatile storage drive 1680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1670 and non-volatile storage drive 1680 may be configured to store the basic programming and data constructs that provide the functionality of various embodiments of the present invention, as described above.

Software instruction sets that provide the functionality of the present invention may be stored in RAM 1670 and non-volatile storage drive 1680. These instruction sets or code may be executed by the processor(s) 1660. RAM 1670 and non-volatile storage drive 1680 may also provide a repository to store data and data structures used in accordance with the present invention. RAM 1670 and non-volatile storage drive 1680 may include a number of memories including a main random access memory (RAM) to store of instructions and data during program execution and a read-only memory (ROM) in which fixed instructions are stored. RAM 1670 and non-volatile storage drive 1680 may include a file storage subsystem providing persistent (non-volatile) storage of program and/or data files. RAM 1670 and non-volatile storage drive 1680 may also include removable storage systems, such as removable flash memory.

Bus subsystem 1690 provides a mechanism to allow the various components and subsystems of computer 1502 communicate with each other as intended. Although bus subsystem 1690 is shown schematically as a single bus, alternative embodiments of the bus subsystem 1690 may utilize multiple busses or communication paths within the computer 1502.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above.

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for using a camera system to determine a location of a camera unit in relation to a three-dimensional model, the method comprising:
    retrieving a model of a worksite, wherein the model is a three-dimensional model;
    retrieving an image of the worksite, wherein:
        the image is acquired using a camera positioned in an interior of a building at the worksite;
        the interior of the building has a first surface and a second surface;
        the first surface is a wall, floor, or ceiling of the building;
        the second surface is a wall, floor, or ceiling of the building; and
        the image includes at least a portion of the first surface and at least a portion of the second surface
    receiving coarse input for a position and/or an orientation of the camera in relation to the model;
    projecting a first feature of the model onto the image;
    comparing the first surface in the image to the first feature of the model projected onto the image;
    projecting a second feature of the model onto the image;
    comparing the second surface in the image to the second feature of the model projected onto the image;
    calculating a first set of parameters of the camera based on aligning the first feature to the first surface in the image;
    calculating a second set of parameters of the camera based on aligning the second feature with the second surface in the image, wherein calculating the second set of parameters is performed independently from calculating the first set of parameters; and
    calculating the position and/or the orientation of the camera in relation to the model based on the first set of parameters and the second set of parameters.

2. The method of claim 1, the first surface is a wall and the second surface is a floor.

3. The method of claim 1, wherein the first feature of the model used comprises at least five points and no more than ten points.

4. The method of claim 1, wherein the first feature of the model comprises a line.

5. The method of claim 4, wherein the line corresponds to an edge of the first surface.

6. The method of claim 4, wherein the first feature of the model comprises an outline of the first surface.

7. The method of claim 1, wherein the first surface in the image is identified by analyzing gradients of pixels in the image.

8. The method of claim 1, further comprising acquiring the image of the worksite using the camera at the worksite, wherein the camera comprises two image sensors in one housing.

9. A camera system comprising:
a camera configured to acquire an image of an interior of a building of a worksite, wherein:
the interior of the building has a first surface and a second surface;
the first surface is a wall, floor, or ceiling of the building; and
the second surface is a wall, floor, or ceiling of the building;
an electronic model of the worksite; and
one or more processors configured to:
retrieve the electronic model of the worksite, wherein the electronic model is a three-dimensional model,
retrieve the image of the worksite, wherein the image includes at least a portion of the first surface and at least a portion of the second surface,
receive coarse input for a position and/or an orientation of the camera in relation to the electronic model,
project a first feature of the electronic model onto the image,
compare the first surface in the image to the first feature in the electronic model projected onto the image,
projecting a second feature of the electronic model onto the image,
compare the second surface in the image to the second feature of the electronic model projected onto the image,
calculate a first set of parameters of the camera based on aligning the first feature to the first surface in the image,
calculate a second set of parameters of the camera based on aligning the second feature with the second surface in the image, wherein calculating the second set of parameters is performed independently from calculating the first set of parameters, and
calculate the position and/or the orientation of the camera in relation to the electronic model based on the first set of parameters and the second set of parameters.

10. The camera system of claim 9, wherein the first feature in the electronic model comprises at least five points and no more than ten points.

11. The camera system of claim 9, wherein the first feature in the electronic model comprises a line.

12. The camera system of claim 11, wherein the line corresponds to an edge of the first surface.

13. The camera system of claim 11, wherein the first feature in the electronic model comprises an outline of the first surface.

14. The camera system of claim 9, wherein the first surface in the image is identified by analyzing gradients of pixels in the image.

15. A memory device comprising instructions that when executed cause one or more processors to:
retrieve a model of a worksite, wherein the model is a three-dimensional model;
retrieve an image of the worksite, wherein:
the image is acquired using a camera positioned in an interior of a building at the worksite;
the interior of the building has a first surface and a second surface;
the first surface is a wall, floor, or ceiling of the building;
the second surface is a wall, floor, or ceiling of the building; and
the image includes at least a portion of the first surface and at least a portion of the second surface;
receive coarse input for a position and/or an orientation of the camera in relation to the model;
project a first feature of the model onto the image;
compare the first surface in the image to the first feature of the model projected onto the image;
project a second feature of the model onto the image;
compare the second surface in the image to the second feature of the model projected onto the image;
calculate a first set of parameters of the camera based on aligning the first feature to the first surface in the image;
calculate a second set of parameters of the camera based on aligning the second feature with the second surface in the image, wherein calculating the second set of parameters is performed independently from calculating the first set of parameters; and
calculate the position and/or the orientation of the camera in relation to the model based on the first set of parameters and the second set of parameters.

16. The memory device of claim 15, further comprising instructions that when executed runs a bundle adjustment algorithm using camera parameters from only one camera to calculate the position and/or the orientation of the camera.

17. The memory device of claim 15, wherein the first feature of the model comprises a line.

18. The memory device of claim 17, wherein the line corresponds to an edge of the first surface.

19. The memory device of claim 17, wherein the first feature of the model comprises an outline of the first surface.

20. The memory device of claim 15, wherein the first surface in the image is identified by analyzing gradients of pixels in the image.

* * * * *